Jan. 19, 1971     S. BLECHER     3,556,652

INDEXING MECHANISM

Filed Sept. 13, 1968     4 Sheets-Sheet 1

*INVENTOR.*
STEPHEN BLECHER

BY John Shaw Stevenson

AGENT.

INVENTOR.
STEPHEN BLECHER
BY
John Shaw Stevenson
AGENT.

United States Patent Office 3,556,652
Patented Jan. 19, 1971

3,556,652
INDEXING MECHANISM
Stephen Blecher, Littleton, Colo., assignor to Honeywell, Inc., Minneapolis, Minn., a corporation of Delaware
Filed Sept. 13, 1968, Ser. No. 759,635
Int. Cl. G03b 23/04
U.S. Cl. 353—116       10 Claims

ABSTRACT OF THE DISCLOSURE

An apparatus for applying a sequential one tooth rotation to advance an indexing pinion in driving contact with the rack teeth of a photographic projector tray in a forward and reverse direction is employed that has a pair of pivoted arms each having a tooth on its outer end and an angle shaped stop therebetween that are mounted on the face of an index drive gear.

It is an object of the present invention to disclose a tray indexing apparatus that has fewer parts, has less complex operation and is more economical to manufacture than presently available tray indexing devices used in photographic slide projectors.

It is another object of the present invention to disclose an indexing apparatus of the aforementioned type having two spaced apart index tooth members and a fixed stop located therebetween forming an integral part of an index drive gear.

It is another object of the present invention to disclose a single indexing apparatus of the aforementioned type that is driven in synchronism with pushing, gripping and kicking slide changing mechanisms.

It is another object of the present invention to disclose a single indexing apparatus of the aforementioned type that is driven in synchronism with the slide changing mechanism and which can periodically rotate a tray index pinion and a tray having a rack in driving engaged within the pinion in a step by step forward and reverse direction.

More specifically it is an object of the present invention to employ a protuberance of a right angle construction as a stop in a reversible indexing mechanism against which a first one of the pivoted arms containing a single driving tooth can be driven into engagement with a tooth of the tray index pinion and to allow the second one of the pivoted arms to be swung free from driving engagement with the pinion when the slide indexing drive mechanism is rotated in one direction and which will allow the first one of the arms to be brought into driving engagement with the stop and second arm to swing free when the mechanism is rotated in the opposite direction.

It is another object of the invention to provide a cantilever spring to assist in moving the nondriving tooth arm into driven engagement with the stop and into immediate driving engagement with the index pinion when a reverse rotation of the slide indexing drive mechanism takes place.

A better understanding of the present invention may be had from the following detailed description when read in connection with the accompanying drawings in which.

Figure 1:
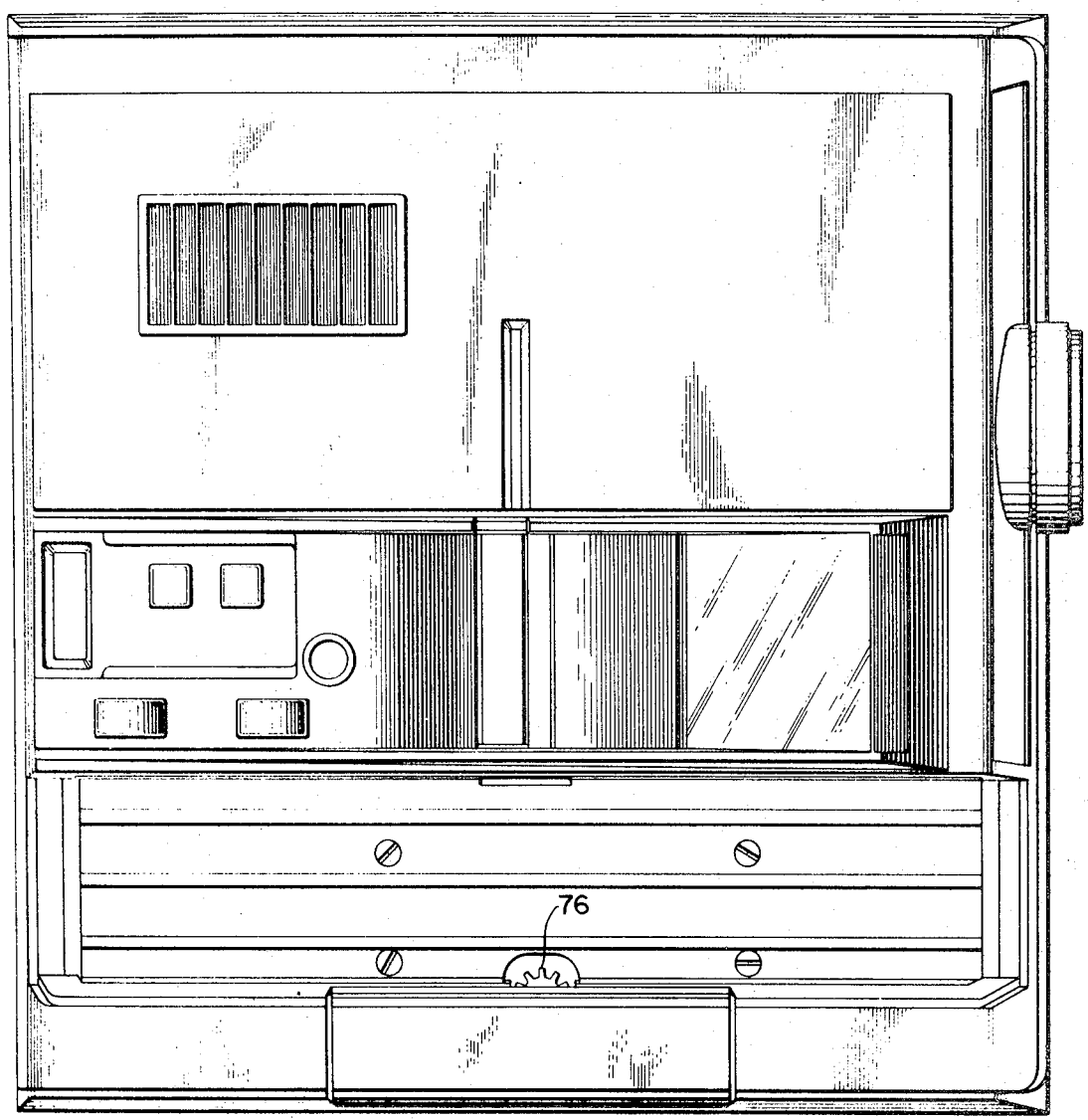
FIG. 1 is an external plan view of the projector showing the position of the tray holder and driving index pinion.

The tray indexing driving apparatus 10 is comprised of three portions namely a reversible motor driven gear reduction drive 12, an index gear 14 forming a portion of the gear reduction drive and a swingable slide tray indexing means 16 rotatable with the index gear.

The motor driven gear reduction drive 12 is comprised of a reversible motor 18 fixedly supported in a vertical position by means of an inverted U-shaped support bracket 20 and screw connections 22, 24 on the mechanism plate 26 of the slide projector 28.

The reversible motor drive 12 is also comprised of a first pulley 30 fixedly mounted on the motor shaft 32 for rotation therewith, a second pulley 34 mounted for rotation on the plate 26, a reduction belt 36 extending between the pulleys 30, 34, a pinion 38 mounted for rotation with pulley 34 and reduction gears 40, 42 mounted for rotation on plate 26 that are driven by pinion 38.

The drive 12 is also comprised of a crank arm driving gear 44 of a slide changing mechanism mounted for rotation on the plate 26 and driven by pinion 42, and idler gear 46 mounted for rotation on plate 26 and driven by gear 44 that is in driving relation with the index gear 14 which forms a second portion of the tray indexing reduction apparatus 10.

As is best shown in FIGS. 4–7 the swingable indexing means 16 is comprised of a right angle shaped stop in the form of a protuberance 48 that is integral with and extends away from the top face of the index gear 14, and two index tooth arm members 50, 52. A separate pivoted pin 54; 56 integral with and protruding from the faces of the index gear 14 provides a bearing surface about which each of their associated index tooth arm members 50, 52 can be swung. The outer ends 58, 60 of each of these respective pins 54, 56 are shown peened over to prevent each of these index tooth members from sliding off each of their respective pins 54, 56.

Each of the index tooth members 50, 52 have a single tooth 62, 64 formed on its outer periphery. Each of the index tooth arm members 50, 52 also have a substantially J-shaped extensible portion 66; 68.

FIGS. 2, 4–7 each show a cantilever leaf spring 70 fixedly connected at its left end to a stationary member 72 and having a bowed shaped portion 74 at its outer end that is positioned to engage the teeth 62, 64.

Figure 5:
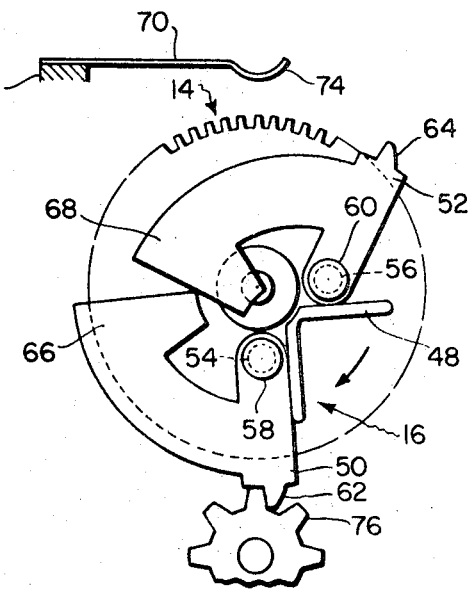
FIG. 5 shows the position of the index apparatus when the slide changing mechanism is driving the tray in a reversed direction from FIG. 4.
Figure 6:
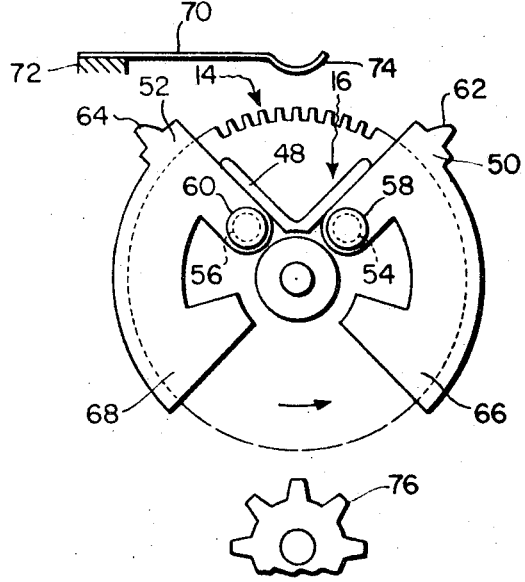
FIG. 6 shows the position of the index apparatus when the slide changing mechanism is in the show position.

It can also be seen that a tray indexing pinion 76 is mounted by means of a shaft for rotation on the mechanism plate at a position that will enable the tooth 62 to be forced by the stop 48 into driving engagement therewith when the index gear 14 is rotated in the direction indicated by the arrow in FIG. 5.

Figure 2:
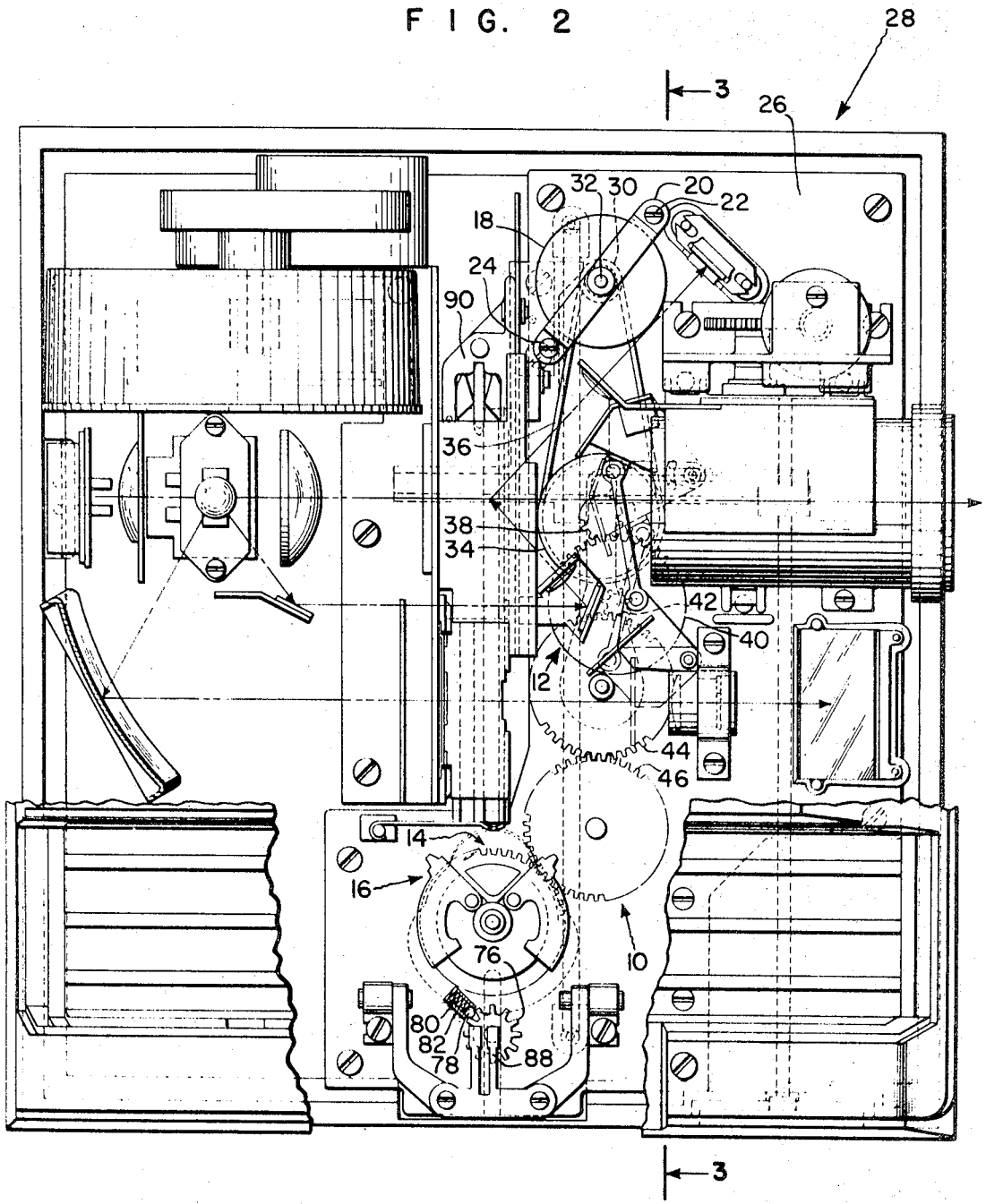
FIG. 2 is a plan view of the projector similar to FIG. 1 but with a portion of the casing removed to reveal the internal driving parts of the slide and index driving mechanism contained therein.
Figure 3:
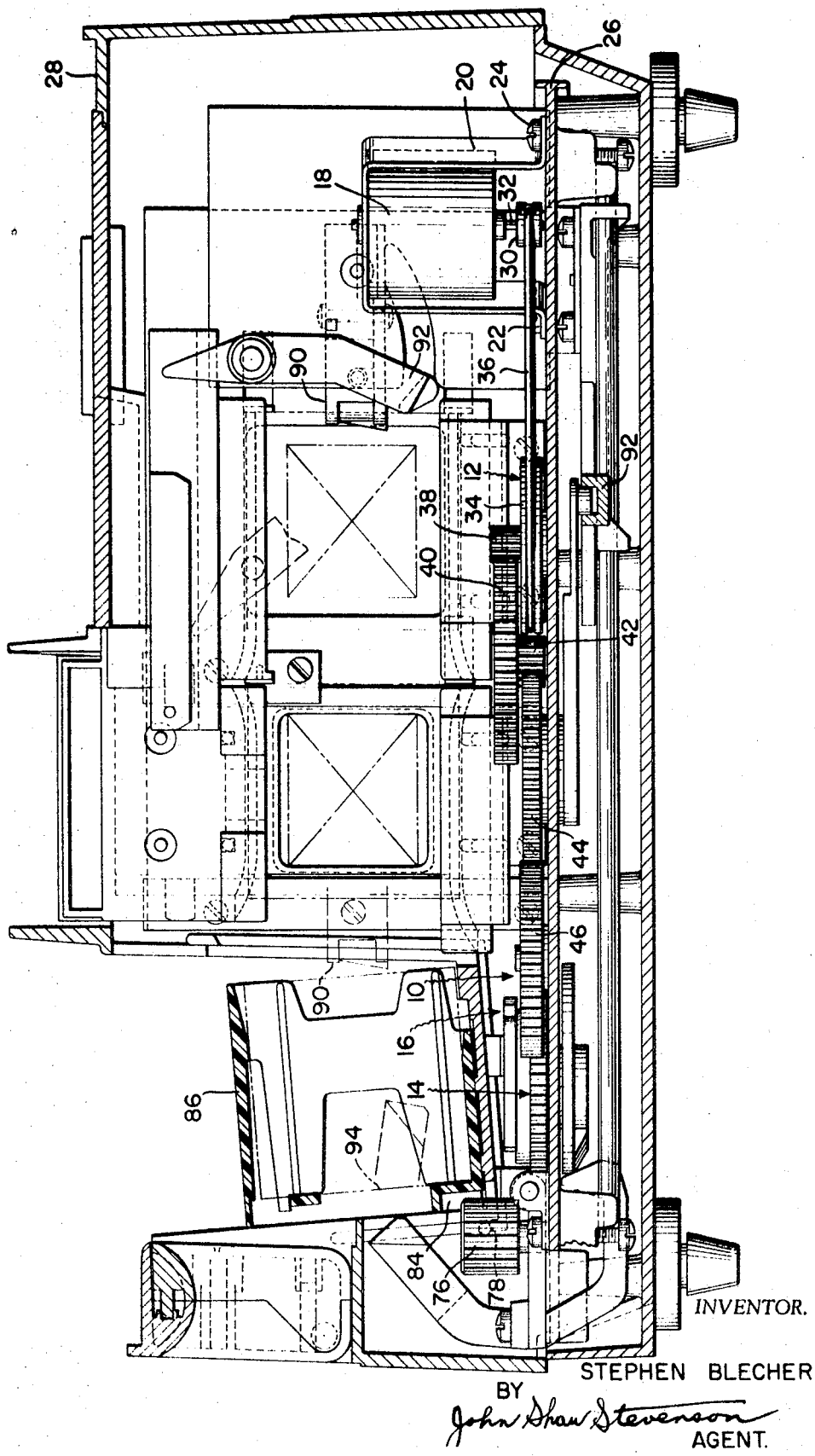
FIG. 3 is a section on 3—3 of FIG. 2 showing the index pinion in driving contact with a rack formed on the side of the tray.
Figure 4:
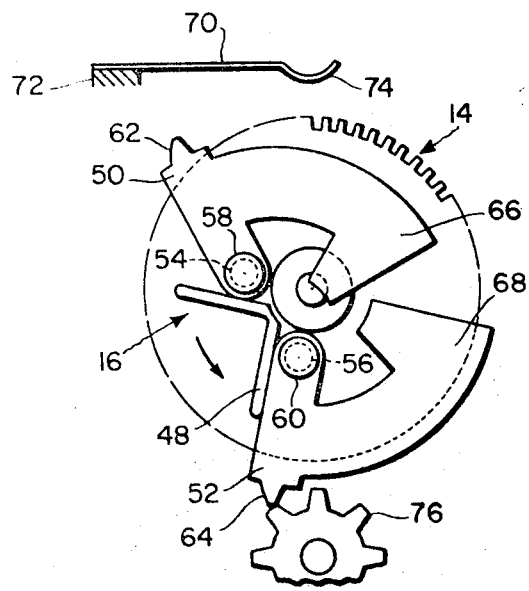
FIG. 4 shows the position of the indexing apparatus when the slide changing mechanism is driving the tray in a forward direction.

When the shaft 32 of motor 18 is rotated in a counterclockwise direction as viewed in FIG. 2 the pulleys 30, 34 and pinion 38 will be rotated in the same counterclockwise direction, the gear 40 and pinion 42 will be rotated in a clockwise direction, the gear 44 will be rotated in a counterclockwise direction, the gear 46 will be rotated.

in a clockwise direction and the index gear 14 will be rotated in a counterclockwise direction as shown in FIG. 4.

When this counterclockwise rotation of the motor takes place the forward edge of the index tooth arm member 52 will be forced against stop 48 and the tooth 64 will be brought into engagement with the tray indexing pinion 76 to advance the pinion 76 clockwise by one tooth length for each rotation of the index gear 14.

While this latter action takes place the sphere 78 will initially be forced out of engagement between two adjacent teeth of pinion 76 against the bias of a coil spring 80, that is located within the stationary casing 82 and which mounts the sphere 78 in longitudinal movable engagement therein. The sphere 78 will then be forced to move outward by the movement of the index pinion 76 along the outer surface of the moving tooth and to then drop into the outer space between the tooth with which it has been in contact and its adjacent tooth to precisely maintain the indexing pinion 76 in its new slide tray retaining position.

During each occasion in which the motor 18 is energized a clockwise one tooth length rotation of the index pinion 76 will take place in the manner previously described and will be retained in that position by the spring bias sphere unit 80, 82, 78. It can also be seen that during each one tooth rotation of the index pinion 76 that the rack 84 that is integral with the tray 86 will be advanced the distance of one slide length so that each successive slide can be aligned with slide pushing, slide gripping, slide kicking and slide changing mechanisms 88, 90, 92 associated with a slide 94 in the tray.

When the direction of the motor 18 is reversed so that shaft 32 is rotated in a clockwise direction as viewed in FIG. 2 that pulley 30 and 34 and pinion 38 will be rotated in the same clockwise direction. The gear 40 and pinion 42 will be rotated in a counterclockwise direction. The gear 44 will be rotated in a clockwise direction, the gear 46 will be rotated in a counterclockwise direction and the index gear 14 will be rotated in a clockwise direction as shown in FIG. 5.

When this clockwise direction of the motor takes place the forward edge of the index member 50 will be forced against stop 48 and the tooth 62 will be brought into engagement with the tray indexing pinion 76 to rotate the pinion 76 counterclockwise by one-tooth length for each rotation of the index gear 14.

While the aforementioned action takes place the sphere 78 will be sequentially moved out of and into its slide index retaining position in the same manner as that previously described. It should be noted that while the index gear 14 is being driven in the tray advancing counterclockwise direction as shown in FIG. 4 the tooth member 50 including its substantially J-shaped portion 66 will be free to rotate in a clockwise direction about its pin pivot 54 due to the centrifugal force inherent in this rotating structure.

The tooth 62 of the tooth member 50 will thus be driven past the index pinion 76 while in a retracted position and nondriving position that will prevent it from being brought into driving engagement with pinion 76.

It should also be noted that while the index gear 14 is being rotated in the reverse tray counterclockwise direction as shown in FIG. 5 the tooth member 52 including its substantially J-shaped portion 68 will be free to rotate in in a counterclockwise direction about its pin pivot 56 due to the centrifugal force inherent in this rotating structure. The tooth 64 of the tooth member 50 will thus be driven past the index pinion 76 while in a retracted position that will prevent it from being brought into driving engagement with the pinion 76.

Figure 7:
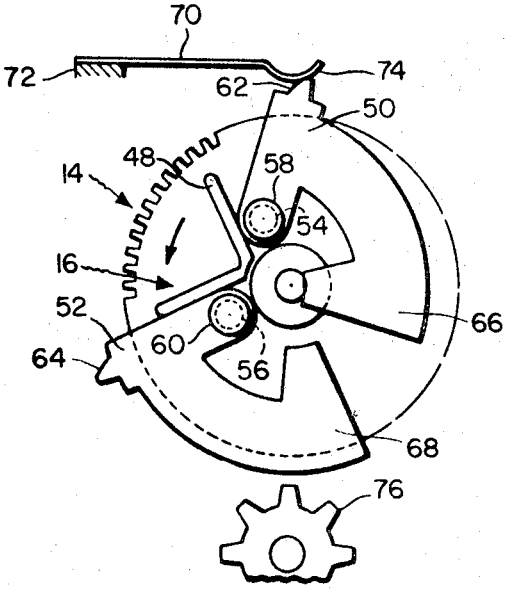
FIG. 7 shows the position of the indexing apparatus immediately after the direction of the indexing gear has been changed from that shown in FIG. 5 and before the position of the indexing gear has reached the position shown in FIG. 4.

FIG. 7 shows the position of the parts of the slide tray indexing means 16 immediately after the motor 18 has been changed from rotation in a counterclockwise direction to a rotation in the clockwise rotation as shown in FIG. 2 and when the index gear 14 is shifted from a counterclockwise rotating position of FIG. 5 to the clockwise rotation position of FIG. 4 and immediately before it has reached the condition as shown in this FIG. 4.

It can be seen in FIG. 7 that the bowed portion 74 of the cantilever spring 70 is engaging the tooth 64 of the member 50 in order to prevent an additional step driving contact from being made between the tooth 26 and the index pinion 76 while the motor and driven index gear 14 is shifted from the FIG. 5 driving condition to the FIG. 4 driving condition. In this manner reverse tooth driving engagement can take place between 64 and the tray driving index pinion 76 before a single reverse revolution of the index gear 14 has taken place.

In a similar but opposite manner it can be seen that the rotation of the motor driven index gear 14 can be reversed from the counterclockwise direction shown in FIG. 4 to a clockwise direction shown in FIG. 5 within less than one revolution of the index gear 14. This is accomplished when the bowed area 74 of leaf spring 70 engages tooth 62 and forces it against the stop 48 a short time after the direction of rotation of the motor 18 and index gear 14 is changed to a direction opposite that shown in FIG. 4 and before the position shown in FIG. 5 is reached.

When a reverse counterclockwise rotation of the index gear 14 to that shown in FIG. 5 occurs the tooth 62 will engage the bowed portion 74 of the leaf spring 70 and this will cause the end of the other J-shaped portion 68 to retain the tooth member 52 against the stop 48. This construction is beneficial because it minimizes the split second time it will take to effect a one tooth step rotation of the index pinion 76 and the tray 86 as shown in FIG. 5 immediately after the direction of the motor 18 has been reversed from the driving direction shown in FIG. 5.

In a similar manner it can be seen that when a reverse clockwise location of the index gear 14 to that shown in FIG. 4 occurs the tooth 64 will engage the bowed portions 74 of the leaf spring 70 and thus will cause the end of the J-shaped portion 68 to swing into contact with the other J-shaped portion 66 to retain the tooth member 50 against the stop 48. This structure is also benficial because it minimizes the split second time it will take to affect a one tooth step rotation of the index pinion 76 and tray 86 from that shown in FIG. 4 immediately after the direction of the motor 18 has been reversed from the driving direction shown in FIG. 4.

During either the time between successive engagements of the tooth 64 with the pinion 76 as shown in FIG. 4 or the time between successive engagements of the tooth 62 with the pinion 78 as shown in FIG. 5 a slide in the tray is moved from the tray into a "show" or a projecting position in the projector from viewing on an edit screen 96 for a preselected period of time in which the motor ceases to rotate. During this time in which the slide is being shown or projected the parts of the slide tray indexing means 16 will be in the position shown in FIG. 6.

The embodiments of the invention in which an exclusive property or privilege is claimed are defined as follows:

1. A reversible slide tray indexing apparatus, comprising a first rotatable member 14, said first rotatable member being adapted to employ a means for driving it in a clockwise direction and a counterclockwise direction, a second rotatable member spaced from the first rotatable member and in driving engagement with a slide tray, a protuberance formed on said first rotatable number, a first tooth arm pivotably mounted on the first rotatable member for swinging into physical rotatable contact with the second rotatable member and into driving engagement with one surface portion of the protuberance to thereby advance the tray in a forward direction when the first rotatable member is driven in one of said directions by the driving means, a second tooth arm rotatably mounted on the rotatable member for swinging away from and out of contact with an opposite surface of the protuberance and in a direction away from physical contact with the second rotatable member during the said last mentioned rotation of the first rotatable member.

2. The indexing apparatus as defined in claim 1 wherein the second tooth arm is pivotally mounted on the first rotatable member for swinging into physical rotatable contact with one surface portion of the protuberance to thereby advance the tray in a reverse direction when the first rotatable member is driven in the other one of said directions by the driving means, the first tooth arm being operable for rotation about its pivot for swinging away from and out of contact with the opposite surface of the protuberance and in a direction away from physical contact with the second rotatable member during the said last mentioned rotation of the first rotatable member.

3. The indexing apparatus as defined in claim 1 wherein each of said first and second tooth arm members is of a substantially I-shaped construction to enable the arm that is out of driving contact with the protuberance to be more readily swung by centrifugal force away from the protuberance and out of driving contact with the second rotatable member while said first member is rotated.

4. The indexing apparatus as disclosed in claim 1 wherein each of the said first and second tooth arm members is of a substantially J-shaped construction and are positioned to be swung into impact relation with one another to move the non-driving tooth arm into driving engagement against the protuberance when the means for driving the first rotatable member is shifted from said one direction of rotation to another and to thereby affect rotation of the second rotatable member in an opposite direction before a complete reverse rotation of the first rotatable member is completed.

5. The apparatus as defined in claim 1 wherein the first rotatable member is an index gear and the second rotatable member is a pinion that is in driving contact with teeth on the tray.

6. The apparatus as defined in claim 1 wherein the first rotatable member is an index gear and the second rotatable member is a pinion that is in driving contact with teeth on the tray and wherein the protuberance is of a right angle shaped construction whose apex is positioned adjacent the center of the index gear and which extends outwardly in a radial direction therefrom.

7. The apparatus disclosed in claim 1 wherein the second rotatable member is a tray indexing pinion, a single tooth is formed on the outer end of one of said arms for striking a tooth on the tray indexing pinion to affect an indexing of the pinion of the tray in a forward direction when the first rotatable member is rotated in said one direction and a single tooth is formed on the outer end of the other arm for striking one tooth on the tray indexing pinion to affect and indexing of the pinion and tray in an opposite direction when the first rotatable member is moved in the opposite direction by said driving means, and a cantilever spring positioned to engage one of the single teeth on one of said arms and to thereby assist in positioning the tooth of the non-driving arm into driving contact with indexing pinion within one revolution of the first rotatable members and during a change in the direction of rotation of the first rotatable member.

8. The apparatus as defined in claim 1 wherein the first arm is mounted at a location which will afford rotation about a pin protruding from the first rotatable member and at a position on the first rotatable member to enable the first arm to be swung by centrifugal force outwardly from the periphery of the first rotatable member into driving engagement with the second rotatable member when the first rotatable member is driven in the said one of the directions and to enable the first arm to be swung by the centrifugal force immediately away from the periphery of the first rotatable member when the rotatable member is driving in a direction that is opposite to the said last mentioned direction.

9. The apparatus as defined in claim 1 wherein the second arm is mounted at a location which will afford rotation about a pin protruding from the first rotatable member and at a position on the first rotatable member to enable the second arm to be swung by centrifugal force outwardly from the periphery of the first rotatable member into driving engagement with the second rotatable member when the first rotatable member is driven in a direction opposite to the said one of the directions and to enable the second arm to be swung by the centrifugal force immediately away from the periphery of the first rotatable member when the rotatable member is driving in said one of the directions.

10. The indexing apparatus as defined in claim 1 wherein the protuberance extends in an angular shaped configuration outwardly from the center of the first rotating member, each of the arms are of a substantially J-shaped configuration, separate pins are employed to connect one end of the top portion of each of the J-shaped arms to the first rotatable member, a tooth is formed at the other end of the top portion of each of the J-shaped arms and the uppermost surface of the top portion of each of the J-shaped arms is engaged by a different side of the angular shaped protuberance when it is brought into driving engagement therewith.

References Cited

UNITED STATES PATENTS

| 3,110,120 | 11/1963 | Danner | 353—116 |
| 3,160,972 | 12/1964 | Hall | 353—116 |
| 3,165,971 | 1/1965 | Zillmer et al. | 353—116 |
| 3,228,132 | 1/1966 | Wiklund | 353—116 |

SAMUEL S. MATTHEWS, Primary Examiner

UNITED STATES PATENT OFFICE
CERTIFICATE OF CORRECTION

Patent No. 3,556,652             Dated January 19, 1971

Inventor(s) Stephen Blecher

It is certified that error appears in the above-identified patent and that said Letters Patent are hereby corrected as shown below:

Column 4,,line 62, cancel "14". Column 5, line 21, "I" should read -- J --.

Signed and sealed this 29th day of June 1971.

(SEAL)
AttestL

EDWARD M. FLETCHER, JR.             WILLIAM E. SCHUYLER, JR.
Attesting Officer                          Commissioner of Patents